United States Patent Office 3,236,670

Patented Feb. 22, 1966

3,236,670

OFFSET ELIMINATING POWDER AND METHOD OF ELIMINATING OFFSET PRINTING

George F. Rooney, Jr., % Winton Engineering Co., 2353 May St., Cincinnati, Ohio 45206

No Drawing. Continuation of application Ser. No. 174,402, Feb. 20, 1962. This application Jan. 27, 1965, Ser. No. 428,561

5 Claims. (Cl. 106—211)

This is a continuation of my application Serial No. 174,402, filed February 20, 1962, now abandoned and a continuation in part of my application Serial No. 117,-778, filed June 9, 1961. This invention relates to a method of eliminating undesired offset printing and to compositions for use in eliminating such offset printing.

In various printing processes, newly printed sheets and the like are stacked one on top of another, and there may be undesired offset printing on sheets adjacent to and facing newly printed sheets. In the past, it has often been the practice to apply powdered starch or the like in the form of a dust to the faces of freshly printed sheets to prevent or minimize such undesired offset printing. Such starch powders adhere to the ink and can cause a rough finish on the ink if the starch particles are not very fine or small. If the starch powder is made sufficiently fine to avoid the formation of such a rough surface, it may not be fully effective in preventing offset printing.

I have found that a greatly improved offset prevention is obtained without providing a rough surface by use of a powder formed from hydrogenated castor oil or the like. This material can be ground to a fine powder of approximately 100 mesh size particles or smaller without loss of the power to prevent offset. A small amount of a finely divided phosphate such as tri-calcium phosphate or aluminum phosphate and a small proportion of china clay can be added to render the powder free flowing. The particles of tri-calcium phosphate and of the china clay should be at least as fine as the powder particles and preferably are substantially finer. Inspection of the powder when sprayed on a printed sheet indicates that the ink and powder grains do not adhere together as is the situation when starch powder is used to prevent offset. The powder can be sprayed on freshly printed sheets by use of commercial powder spraying devices of the type formerly used for spraying starch powders. A suitable device for spraying my improved powder is shown in my Patent No. 2,850,214.

If desired, a starch powder may be mixed with the hydrogenated castor oil powder. Commercial potato starch may be used or other starches such as tapioca starch, arrowroot starch, corn starch, wheat starch, or rice starch may be used. The starch is pulverized to form a fine powder which is mixed with the hydrogenated castor oil to form a powder for spraying on freshly printed sheets. The starch is pulverized to a particle size as is commonly employed in starch powders or can be pulverized to a finer particle size so that substantially none of the starch particles are sufficiently large to cause rough spots when applied to a printed sheet.

The following examples are given to illustrate the invention in greater detail, but it is to be understood that the examples are given primarily by way of example rather than by way of limitation, except as set forth in the claims. In the following examples, all parts and percentages are taken by weight.

*Example 1*

200 parts of flakes of a commercial hydrogenated castor oil having an iodine value of from 2.0 to 4.0 and a titre of 70 to 75 degrees centigrade were pulverized in a hammermill until all would pass 100 mesh commercial screen. During pulverization, the partially pulverized hydrogenated castor oil was periodically removed from the mill and sieved, portions not passing the sieve being returned for further pulverizing. To the pulverized hydrogenated castor oil were added two parts of pulverized tri-calcium phosphate and one part of pulverized china clay. The phosphate, china clay, and pulverized hydrogenated castor oil were thoroughly mixed. The mixture was sprayed on the printed sheets in commercial offset eliminating spray equipment and was highly effective in eliminating offset.

*Example 2*

Another sample of 100 parts of the commercial hydrogenated castor oil described in Example 1, was pulverized in the manner described in Example 1 until all would pass a 100 mesh commercial screen. 100 parts of commercial potato starch were pulverized to pass a 100 mesh commercial screen and were thoroughly mixed with the pulverized hydrogenated castor oil and with one part of tri-calcium phosphate. The mixture was sprayed on printed sheets in commercial offset eliminating spray equipment and was effective in eliminating offset.

*Example 3*

Another sample of 100 parts of the commercial hydrogenated castor oil described in Example 1 was pulverized in the manner described in Example 1 until all would pass a 100 mesh commercial screen. Two parts of potato starch were pulverized to pass a 100 mesh commercial screen and were thoroughly mixed with the pulverized hydrogenated castor oil to form a mixture. The mixture was sprayed on printed sheets in commercial offset eliminating spray equipment and was effective in eliminating offset.

The new powders are effective in preventing offset both with gloss inks and with flat inks. Since the hydrogenated castor oil does not stick to and is not wet by the ink, larger or coarser grain sizes can be used than with usual starch powders without fear of a resulting roughness of the sheet. Slight abrasive action, such as the sliding of one sheet on top of another, loosens the hydrogenated castor oil material and permits it to fall off, for the most part, in subsequent handling.

The hydrogenated castor oil powders are particularly valuable in preventing offset of printing on waxed cartons such as those used for frozen foods and the like. They can be sprayed on printed faces of such cartons. Thereafter, when the cartons are wax coated, the powder melts off because it has a lower melting point than the wax.

When the hydrogenated castor oil is mixed with a starch powder, sufficiently fine starch particles can be used to prevent rough finish formation. In order to obtain the value of the hydrogenated castor oil, preferably no more than 50% of the powder by weight is a starch while the remainder is finely divided castor oil to which minor amounts of flow promoters such as tri-calcium phosphate and china clay are added. However, even where greater percentages of starch are present in a mixture with powdered hydrogenated castor oil, the hydrogenated castor oil improves offset eliminating characteristics thereof.

The powder compositions and method of preventing offset printing described above are subject to variation without departing from the spirit and scope of the appended claims.

Having described my invention, what I claim as new and desire to secure by Letters Patent is:

1. An offset eliminating powder which consists essentially of 1% to 50% by weight powdered starch, substantially all the remainder being powdered hydrogenated castor oil.

2. An offset eliminating powder which consists essentially of 1% to 50% by weight powdered starch, substantially all the remainder being powdered hydrogenated castor oil together with a sufficient amount of tri-calcium phosphate flow-promoting agent that the hydrogenated castor oil flows freely.

3. An offset eliminating powder which consists essentially of 1% to 50% by weight powdered starch, substantially all of the remainder being powdered hydrogenated castor oil together with a sufficient amount of aluminum phosphate flow-promoting agent that the hydrogenated castor oil flows freely.

4. An offset eliminating powder which consists essentially of 1% to 50% by weight powdered starch, substantially all of the remainder being powdered hydrogenated castor oil together with a sufficient amount of tri-calcium phosphate and china clay flow-promoting agents that the hydrogenated castor oil flows freely.

5. An offset eliminating powder which consists essentially of 1% to 50% by weight powdered starch, substantially all of the remainder being powdered hydrogenated castor oil together with a sufficient amount of aluminum phosphate and china clay flow-promoting agents that the hydrogenated castor oil flows freely.

References Cited by the Examiner

UNITED STATES PATENTS

| | | | |
|---|---|---|---|
| 1,733,524 | 10/1929 | Bradner | 106—214 |
| 2,114,792 | 4/1938 | Young | 106—214 X |
| 2,250,115 | 7/1941 | Mayer et al. | 106—211 |
| 2,614,945 | 10/1952 | Krisan | 106—214 |
| 2,645,584 | 7/1953 | Wiegerink | 106—211 |

ALEXANDER H. BRODMERKEL, *Primary Examiner.*

ROBERT F. WHITE, *Examiner.*

D. J. ARNOLD, *Assistant Examiner.*